(12) United States Patent  
Guo

(10) Patent No.: US 10,999,139 B2  
(45) Date of Patent: May 4, 2021

(54) ONLINE UPGRADE METHOD, APPARATUS, AND SYSTEM

(71) Applicant: Huawei Technologies Co., Ltd., Shenzhen (CN)

(72) Inventor: Hongxing Guo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 139 days.

(21) Appl. No.: 16/112,374

(22) Filed: Aug. 24, 2018

(65) Prior Publication Data

US 2018/0367379 A1 Dec. 20, 2018

Related U.S. Application Data

(63) Continuation of application No. PCT/CN2017/072993, filed on Feb. 6, 2017.

(30) Foreign Application Priority Data

Feb. 25, 2016 (CN) .......................... 201610104513.6

(51) Int. Cl.
*H04L 12/24* (2006.01)
*G06F 3/06* (2006.01)
*G06F 11/14* (2006.01)

(52) U.S. Cl.
CPC .......... *H04L 41/082* (2013.01); *G06F 3/0607* (2013.01); *G06F 3/067* (2013.01);
(Continued)

(58) Field of Classification Search
CPC ... H04L 41/082; H04L 41/0843; G06F 3/067; G06F 3/0607; G06F 3/0647; G06F 3/0653; G06F 11/1448; G06F 11/1464
See application file for complete search history.

(56) References Cited

U.S. PATENT DOCUMENTS 9,021,459 B1* 4/2015 Qu .......................... G06F 8/65 710/33
9,904,599 B2* 2/2018 Yin ..................... G06F 11/1662
(Continued)

FOREIGN PATENT DOCUMENTS

CN 1862476 A 11/2006
CN 101515296 A 8/2009
(Continued)

*Primary Examiner* — Azizul Choudhury
(74) *Attorney, Agent, or Firm* — Slater Matsil, LLP

(57) ABSTRACT

In a method, identifiers are obtained of N to-be-upgraded nodes. An upgrade sequence of the N to-be-upgraded nodes is set according to the identifiers of the N to-be-upgraded nodes. A backup node of each to-be-upgraded node is determined according to the upgrade sequence of the N to-be-upgraded nodes, to obtain node backup information. A backup node of the $X^{th}$ to-be-upgraded node is at least one node in a set that includes a to-be-upgraded node prior to the $X^{th}$ to-be-upgraded node and a to-be-upgraded node following the $(X+[Z+1])^{th}$ to-be-upgraded node. Z is a ratio of a time required by the $X^{th}$ to-be-upgraded node for migrating back service data to an online upgrade time of the $X^{th}$ to-be-upgraded node. The node backup information is sent to the N to-be-upgraded nodes.

19 Claims, 11 Drawing Sheets

(52) U.S. Cl.
CPC .......... *G06F 3/0647* (2013.01); *G06F 3/0653* (2013.01); *G06F 11/1448* (2013.01); *G06F 11/1464* (2013.01); *H04L 41/0843* (2013.01)

(56) References Cited

U.S. PATENT DOCUMENTS

| | | |
|---|---|---|
| 2004/0019752 A1 | 1/2004 | Burton et al. |
| 2006/0190553 A1* | 8/2006 | Kojima ............... H04L 67/1095 709/216 |
| 2008/0189498 A1 | 8/2008 | Brown |
| 2009/0019094 A1* | 1/2009 | Lashley ............... G06F 9/5027 |
| 2009/0158080 A1* | 6/2009 | Furuya ................ G06F 11/1464 714/2 |
| 2011/0208995 A1 | 8/2011 | Hafner et al. |
| 2011/0238625 A1* | 9/2011 | Hamaguchi ......... G06F 11/1464 707/640 |
| 2016/0004610 A1 | 1/2016 | Knight et al. |

FOREIGN PATENT DOCUMENTS

| | | |
|---|---|---|
| CN | 101656624 A | 2/2010 |
| CN | 101741894 A | 6/2010 |
| CN | 101753349 A | 6/2010 |
| CN | 103516735 A | 1/2014 |
| CN | 103533047 A | 1/2014 |
| CN | 105786405 A | 7/2016 |

* cited by examiner

ONLINE UPGRADE METHOD, APPARATUS, AND SYSTEM

CROSS-REFERENCE TO RELATED APPLICATIONS

This application is a continuation of International Application No. PCT/CN2017/072993, filed on Feb. 6, 2017, which claims priority to Chinese Patent Application No. 201610104513.6, filed on Feb. 25, 2016. The disclosures of the aforementioned applications are hereby incorporated by reference in their entireties.

TECHNICAL FIELD

The present invention relates to the field of computer technologies, and in particular, to an online upgrade method, apparatus, and system.

BACKGROUND

In a distributed storage system, a redundant array of independent disks (RAID) technology may be used to store strips in a same stripe onto different storage nodes. A strip may be a data strip or a redundant strip. In a same stripe, there are a specific quantity of data strips and a specific quantity of redundant strips. For example, one stripe includes four data strips and one redundant strip, and the one redundant strip and any three of the four data strips may be used to restore a remaining one data strip. That is, in one stripe, a quantity of unavailable data strips should be less than a quantity of redundant strips, so as to ensure effective restoration of the unavailable data strips.

As shown in FIG. 1, four data strips and one redundant strip in a stripe 1 are separately stored on five storage nodes. When a storage node 1 is upgraded online, a storage node 2 is determined as a backup node of the storage node 1, and is configured to store write data that needs to be written during the online upgrade of the storage node 1. For example, the write data is data in a stripe 2. Likewise, the stripe 2 also includes four data strips and one redundant strip. In this case, the storage node 2 not only stores one data strip that is in the stripe 2 and that is originally written onto the storage node 2, but also stores one data strip that needs to be written onto the storage node 1. That is, the storage node 2 stores two data strips in the stripe 2.

In this case, when the storage node 1 completes the online upgrade, if a next to-be-upgraded node is the storage node 2, and if the storage node 2 is directly powered off for an online upgrade, the two data strips that are in the stripe 2 and that are stored on the storage node 2 cannot be restored from the one redundant strip and two data strips that remain in the stripe 2. As a result, a user cannot read the two data strips that are in the stripe 2 and that are stored on the storage node 2. Therefore, before the storage node 2 is upgraded, one data strip that needs to be written onto the storage node 1 and that is stored on the storage node 2 needs to be migrated back to the storage node 1. Further, a backup node needs to be selected for the storage node 2 to complete the upgrade of the storage node 2, until upgrades of the five storage nodes are all completed.

It can be learned that, each time a current storage node is upgraded, an extra time further needs to be waited to migrate, back to a previously upgraded storage node, service data that is temporarily written onto the storage node serving as a backup node. Consequently, an online upgrade time of the overall distributed storage system increases.

SUMMARY

Embodiments of the present invention provide an online upgrade method, apparatus, and system, so as to shorten an online upgrade time of each storage node in a distributed storage system.

To achieve the foregoing objective, the following technical solutions are used in the embodiments of the present invention.

According to a first aspect, an embodiment of the present invention provides an online upgrade method. The method includes obtaining, by a monitoring node, identifiers of N to-be-upgraded nodes, where N≥3. The method also includes setting, by the monitoring node, an upgrade sequence of the N to-be-upgraded nodes according to the identifiers of the N to-be-upgraded nodes. The N to-be-upgraded nodes have different ranks in the upgrade sequence. The method also includes determining, by the monitoring node, a backup node of each to-be-upgraded node in the N to-be-upgraded nodes according to the upgrade sequence of the N to-be-upgraded nodes, to obtain node backup information. The node backup information includes a correspondence between an identifier of each to-be-upgraded node and an identifier of a backup node of the to-be-upgraded node. A backup node of the $X^{th}$ to-be-upgraded node is at least one node in a set including a to-be-upgraded node prior to the $X^{th}$ to-be-upgraded node in the upgrade sequence and a to-be-upgraded node following the $(X+[Z+1])^{th}$ to-be-upgraded node in the upgrade sequence. Z is a ratio of a time required by the $X^{th}$ to-be-upgraded node for migrating back service data to an online upgrade time of the $X^{th}$ to-be-upgraded node, and $1 \leq X \leq N$. The method further includes sending, by the monitoring node, the node backup information to the N to-be-upgraded nodes. Service data that needs to be written onto the to-be-upgraded node is stored onto a backup node of the to-be-upgraded node according to the node backup information, during an online upgrade of any to-be-upgraded node in the N to-be-upgraded nodes.

It can be learned that, according to the online upgrade method provided in this embodiment of the present invention, the upgrade sequence of the N to-be-upgraded nodes is strictly controlled, and in addition, for each to-be-upgraded node, a node that has a relatively low rank in the upgrade sequence or that has completed an upgrade is selected as a backup node of the to-be-upgraded node, so as to ensure that read and write of service data are not affected during an online upgrade of each to-be-upgraded node. In addition, the $(X+1)^{th}$ to-be-upgraded node may directly start an online upgrade after the $X^{th}$ to-be-upgraded node completes an upgrade, without a need to wait for the $X^{th}$ to-be-upgraded node to complete migrating back the service data. Therefore, after completing the online upgrade, each to-be-upgraded node in the distributed storage system may directly perform a service data migrate-back process, and the migrate-back process does not affect an online upgrade of a subsequent to-be-upgraded node. This greatly shortens the online upgrade time of each to-be-upgraded node in the distributed storage system and improves online upgrade efficiency.

In a possible design, when X=1, the backup node of the $X^{th}$ to-be-upgraded node is the $N^{th}$ to-be-upgraded node; or when $1<X \leq N$, the backup node of the $X^{th}$ to-be-upgraded node is the $(X-1)^{th}$ to-be-upgraded node.

The backup node of the $X^{th}$ to-be-upgraded node is a to-be-upgraded node prior to the $X^{th}$ to-be-upgraded node in the upgrade sequence. Therefore, when the $X^{th}$ to-be-upgraded node is upgraded online, the $(X-1)^{th}$ to-be-upgraded node takes over a write service of the $X^{th}$ to-be-upgraded node. In this case, the $(X-1)^{th}$ to-be-upgraded node has completed an upgrade. When the $X^{th}$ to-be-upgraded node completes the online upgrade, the monitoring node may directly instruct the $(X+1)^{th}$ to-be-upgraded node to perform an online upgrade. That is, the $(X+1)^{th}$ to-be-upgraded node may directly perform an online upgrade, without a need to wait for the $X^{th}$ to-be-upgraded node to complete migrating back the service data and without a need to calculate a ratio of a time required by the to-be-upgraded node for migrating back the service data to an online upgrade time of the to-be-upgraded node. This greatly shortens the online upgrade time of each to-be-upgraded node in the distributed storage system and improves the online upgrade efficiency.

In a possible design, after the sending, by the monitoring node, the node backup information to the N to-be-upgraded nodes, the method further includes: sending, by the monitoring node, a first upgrade instruction to the N to-be-upgraded nodes, where the first upgrade instruction carries an identifier of the first to-be-upgraded node, and the first upgrade instruction is used to trigger the first to-be-upgraded node to perform an online upgrade; receiving, by the monitoring node, an upgrade completion response sent by the first to-be-upgraded node; and sending, by the monitoring node, a data migrate-back instruction to the first to-be-upgraded node, so that the first to-be-upgraded node migrates back, from the $N^{th}$ to-be-upgraded node according to the data migrate-back instruction, service data that needs to be written onto the first to-be-upgraded node.

In a possible design, after the monitoring node receives an upgrade completion response sent by the $(X-1)^{th}$ to-be-upgraded node, the method further includes: sending, by the monitoring node, a second upgrade instruction to the N to-be-upgraded nodes, where the second upgrade instruction carries an identifier of the $X^{th}$ to-be-upgraded node, and the second upgrade instruction is used to trigger the $X^{th}$ to-be-upgraded node to perform an online upgrade.

It can be learned that, after the $(X-1)^{th}$ to-be-upgraded node completes the online upgrade, the $X^{th}$ to-be-upgraded node following the $(X-1)^{th}$ to-be-upgraded node in the upgrade sequence may immediately perform the online upgrade. This greatly shortens the online upgrade time of each to-be-upgraded node in the distributed storage system.

In a possible design, the method further includes: if the monitoring node receives an upgrade completion response sent by the $(N-1)^{th}$ to-be-upgraded node, determining, by the monitoring node, whether the first to-be-upgraded node has completed migrating back the service data from the $N^{th}$ to-be-upgraded node; and if the first to-be-upgraded node has completed migrating back the service data from the $N^{th}$ to-be-upgraded node, sending, by the monitoring node, a third upgrade instruction to the N to-be-upgraded nodes, where the third upgrade instruction carries an identifier of the $N^{th}$ to-be-upgraded node, and the third upgrade instruction is used to trigger the $N^{th}$ to-be-upgraded node to perform an online upgrade.

According to a second aspect, an embodiment of the present invention provides an online upgrade method. The method includes obtaining, by a first to-be-upgraded node, node backup information sent by a monitoring node. The node backup information includes a correspondence between an identifier of each to-be-upgraded node in N to-be-upgraded nodes and an identifier of a backup node of the to-be-upgraded node. The first to-be-upgraded node is any one of the N to-be-upgraded nodes, and N≥3. The method also includes receiving, by the first to-be-upgraded node, a local-node upgrade instruction sent by the monitoring node, where the local-node upgrade instruction carries an identifier of the first to-be-upgraded node. The method further includes executing, by the first to-be-upgraded node, an online upgrade operation according to the local-node upgrade instruction.

In a possible design, after the executing, by the first to-be-upgraded node, an online upgrade operation according to the local-node upgrade instruction, the method further includes: sending, by the first to-be-upgraded node, an upgrade completion response to the monitoring node; receiving, by the first to-be-upgraded node, a data migrate-back instruction sent by the monitoring node; and migrating back, by the first to-be-upgraded node from a backup node of the first to-be-upgraded node according to the data migrate-back instruction, service data that needs to be written onto the first to-be-upgraded node.

In a possible design, after the obtaining, by a first to-be-upgraded node, node backup information sent by a monitoring node, the method further includes: receiving, by the first to-be-upgraded node, a non-local-node upgrade instruction sent by the monitoring node, where the non-local-node upgrade instruction carries an identifier of the second to-be-upgraded node, and the second to-be-upgraded node is any to-be-upgraded node in the N to-be-upgraded nodes except the first to-be-upgraded node; determining, by the first to-be-upgraded node, a backup node of the second to-be-upgraded node according to the non-local-node upgrade instruction and the node backup information; and if the first to-be-upgraded node receives service data that needs to be written onto the second to-be-upgraded node, sending, by the first to-be-upgraded node, the service data to the backup node of the second to-be-upgraded node.

According to a third aspect, an embodiment of the present invention provides a monitoring node. The monitoring node includes an obtaining unit, a sorting unit, a determining unit, and a sending unit. The obtaining unit is configured to obtain identifiers of N to-be-upgraded nodes, where N≥3. The sorting unit is configured to set an upgrade sequence of the N to-be-upgraded nodes according to the identifiers of the N to-be-upgraded nodes. The N to-be-upgraded nodes have different ranks in the upgrade sequence. The determining unit is configured to determine a backup node of each to-be-upgraded node in the N to-be-upgraded nodes according to the upgrade sequence of the N to-be-upgraded nodes, to obtain node backup information. The node backup information includes a correspondence between an identifier of each to-be-upgraded node and an identifier of a backup node of the to-be-upgraded node. A backup node of the $X^{th}$ to-be-upgraded node is at least one node in a set including a to-be-upgraded node prior to the $X^{th}$ to-be-upgraded node in the upgrade sequence and a to-be-upgraded node following the $(X+[Z+1])^{th}$ to-be-upgraded node in the upgrade sequence. Z is a ratio of a time required by the $X^{th}$ to-be-upgraded node for migrating back service data to an online upgrade time of the $X^{th}$ to-be-upgraded node, and $1 \leq X \leq N$. The sending unit, configured to send the node backup information to the N to-be-upgraded nodes. Service data that needs to be written onto the to-be-upgraded node is stored onto a backup node of the to-be-upgraded node according to the node backup information, during an online upgrade of any to-be-upgraded node in the N to-be-upgraded nodes.

In a possible design, the sending unit is further configured to send a first upgrade instruction to the N to-be-upgraded nodes, where the first upgrade instruction carries an identifier of the first to-be-upgraded node, and the first upgrade instruction is used to trigger the first to-be-upgraded node to perform an online upgrade; the obtaining unit is further configured to receive an upgrade completion response sent by the first to-be-upgraded node; and the sending unit is further configured to send a data migrate-back instruction to the first to-be-upgraded node, so that the first to-be-upgraded node migrates back, from the $N^{th}$ to-be-upgraded node according to the data migrate-back instruction, service data that needs to be written onto the first to-be-upgraded node, where when X=1, the backup node of the $X^{th}$ to-be-upgraded node is the $N^{th}$ to-be-upgraded node; or when $1<X\leq N$, the backup node of the $X^{th}$ to-be-upgraded node is the $(X-1)^{th}$ to-be-upgraded node.

In a possible design, the sending unit is further configured to send a second upgrade instruction to the N to-be-upgraded nodes, where the second upgrade instruction carries an identifier of the $X^{th}$ to-be-upgraded node, and the second upgrade instruction is used to trigger the $X^{th}$ to-be-upgraded node to perform an online upgrade.

In a possible design, the monitoring node further includes a judging unit, where the judging unit is configured to: if an upgrade completion response sent by the $(N-1)^{th}$ to-be-upgraded node is received, determine whether the first to-be-upgraded node has completed migrating back the service data from the $N^{th}$ to-be-upgraded node; and the sending unit is further configured to: if the first to-be-upgraded node has completed migrating back the service data from the $N^{th}$ to-be-upgraded node, the monitoring node sends a third upgrade instruction to the N to-be-upgraded nodes, where the third upgrade instruction carries an identifier of the $N^{th}$ to-be-upgraded node, and the third upgrade instruction is used to trigger the $N^{th}$ to-be-upgraded node to perform an online upgrade.

According to a fourth aspect, an embodiment of the present invention provides a to-be-upgraded node. The to-be-upgraded node includes an obtaining unit, and an upgrade unit. The obtaining unit is configured to obtain node backup information sent by a monitoring node. The node backup information includes a correspondence between an identifier of each to-be-upgraded node in N to-be-upgraded nodes and an identifier of a backup node of the to-be-upgraded node, and N≥3. The obtaining unit is also configured to receive a local-node upgrade instruction sent by the monitoring node. The local-node upgrade instruction carries an identifier of a first to-be-upgraded node. The first to-be-upgraded node is any one of the N to-be-upgraded nodes. The upgrade unit is configured to execute an online upgrade operation according to the local-node upgrade instruction.

In a possible design, the to-be-upgraded node further includes a sending unit and a migrate-back unit, where the sending unit is configured to send an upgrade completion response to the monitoring node; the obtaining unit is further configured to receive a data migrate-back instruction sent by the monitoring node; and the migrate-back unit is configured to migrate back, from a backup node of the first to-be-upgraded node according to the data migrate-back instruction, service data that needs to be written onto the first to-be-upgraded node.

In a possible design, the to-be-upgraded node further includes a determining unit, where the obtaining unit is further configured to receive a non-local-node upgrade instruction sent by the monitoring node, where the non-local-node upgrade instruction carries an identifier of a second to-be-upgraded node, and the second to-be-upgraded node is any to-be-upgraded node in the N to-be-upgraded nodes except the first to-be-upgraded node; the determining unit is configured to determine a backup node of the second to-be-upgraded node according to the non-local-node upgrade instruction and the node backup information; and the sending unit is further configured to: if service data that needs to be written onto the second to-be-upgraded node is received, send the service data to the backup node of the second to-be-upgraded node.

According to a fifth aspect, an embodiment of the present invention provides a monitoring node, including: a processor, a memory, a bus, and a communications interface. The memory is configured to store a computer-executable instruction. The processor and the memory are connected by using the bus. When the monitoring node runs, the processor executes the computer-executable instruction stored on the memory, so that the monitoring node executes the online upgrade method according to any design manner of the first aspect.

According to a sixth aspect, an embodiment of the present invention provides a to-be-upgraded node that includes a processor, a memory, a bus, and a communications interface. The memory is configured to store a computer-executable instruction. The processor and the memory are connected by using the bus. When the to-be-upgraded node runs, the processor executes the computer-executable instruction stored on the memory, so that the to-be-upgraded node executes the online upgrade method according to any design manner of the first aspect.

According to a seventh aspect, an embodiment of the present invention provides an online upgrade system that includes the monitoring node according to any design manner of the third aspect and the N to-be-upgraded nodes according to any design manner of the fourth aspect, where N≥3.

According to an eighth aspect, an embodiment of the present invention provides a computer storage medium that is configured to store a computer software instruction used by the foregoing monitoring node, The computer software instruction includes a program designed for the monitoring node for executing the foregoing aspects.

According to a ninth aspect, an embodiment of the present invention provides a computer storage medium that is configured to store a computer software instruction used by the foregoing to-be-upgraded node. The computer software instruction includes a program designed for the to-be-upgraded node for executing the foregoing aspects.

In the present invention, names of the monitoring node and the to-be-upgraded node constitute no limitation on devices themselves. In actual implementation, these devices may have other names, provided that a function of each device is similar to that in the present invention, and falls within the scope of the claims and their equivalent technologies.

In addition, for technical effects brought by any design manner of the second to the ninth aspects, refer to technical effects brought by different design manners of the first aspect, and details are not described herein again.

These aspects or other aspects of the present invention may be clearer in descriptions of the following embodiments.

BRIEF DESCRIPTION OF THE DRAWINGS

To describe the technical solutions in the embodiments of the present invention or in the prior art more clearly, the following briefly describes the accompanying drawings required for describing the embodiments or the prior art.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention.

In addition, the terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In descriptions of the present invention, a meaning of "multiple" is two or more unless otherwise stated.

Figure 1:
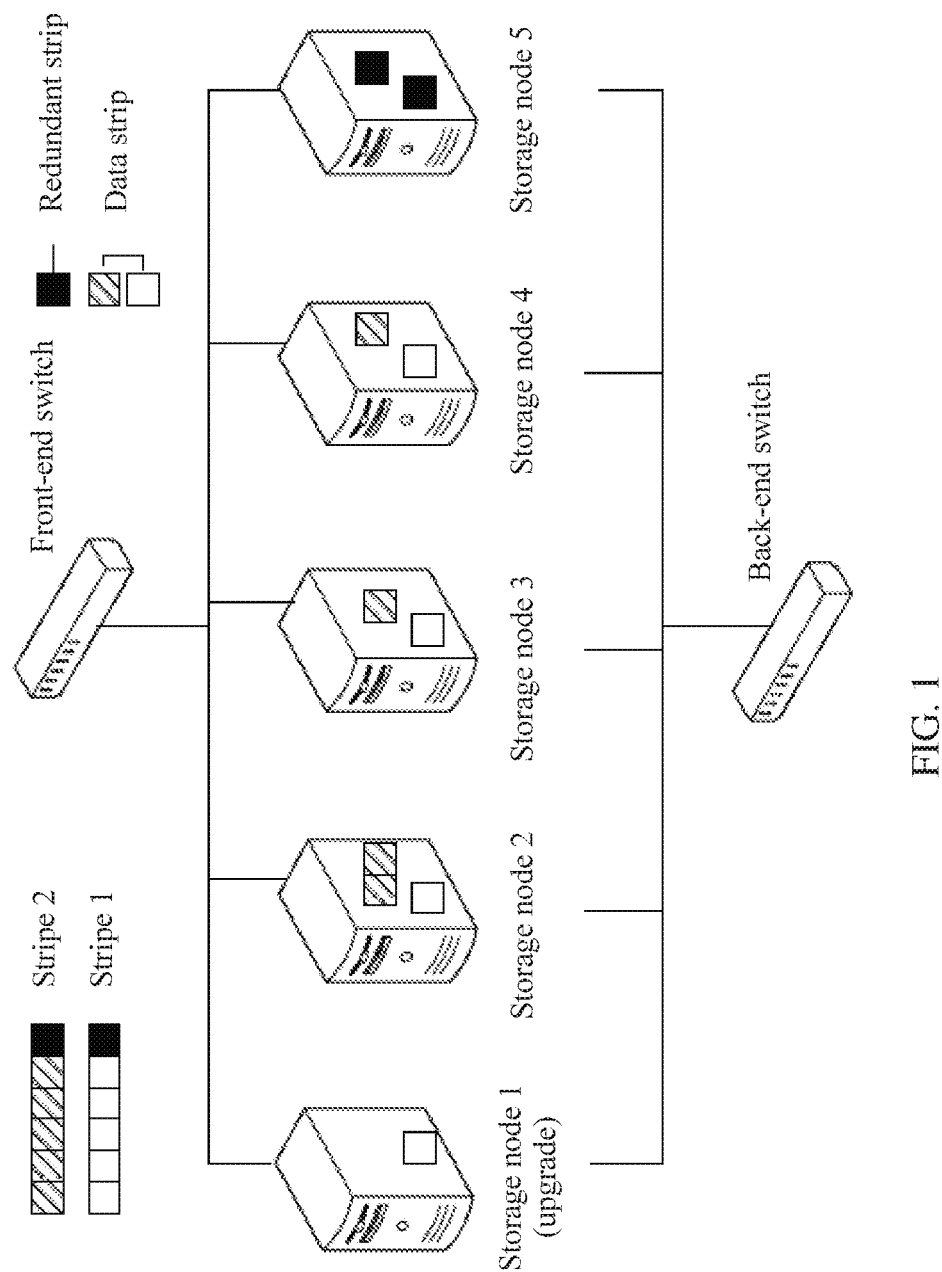
FIG. 1 is a schematic diagram of a scenario in which each storage node in a distributed storage system is upgraded online in the prior art.
Figure 2:
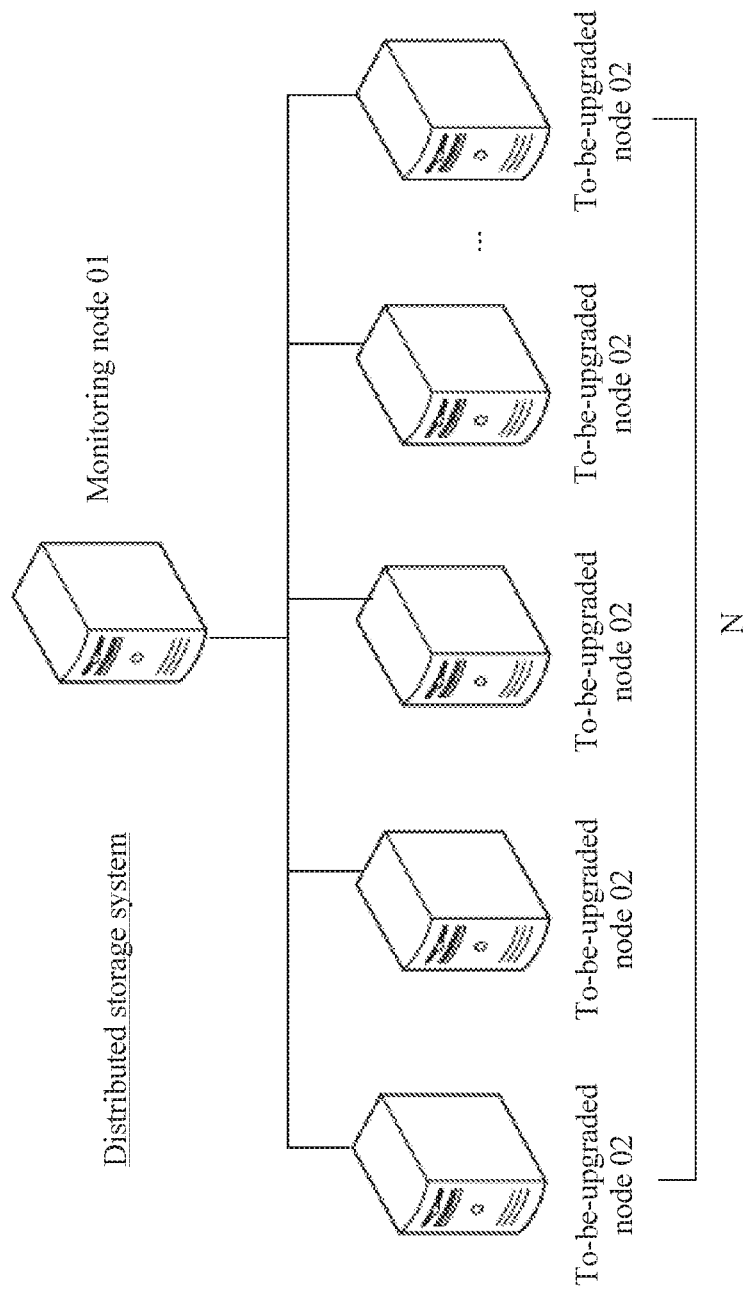
FIG. 2 is a schematic diagram 1 of a scenario of an online upgrade system according to an embodiment of the present invention.

An embodiment of the present invention provides an online upgrade method, and the online upgrade method may be applied to a distributed storage system and may be used to upgrade an operating system or software that is installed on each to-be-upgraded node in the distributed storage system. As shown in FIG. 2, the distributed storage system includes a monitoring node 01 and N to-be-upgraded nodes 02. The monitoring node 01 may communicate with the N to-be-upgraded nodes 02, one to-be-upgraded node 02 may store one or more strip blocks of different stripes, and N≥3.

Figure 3:
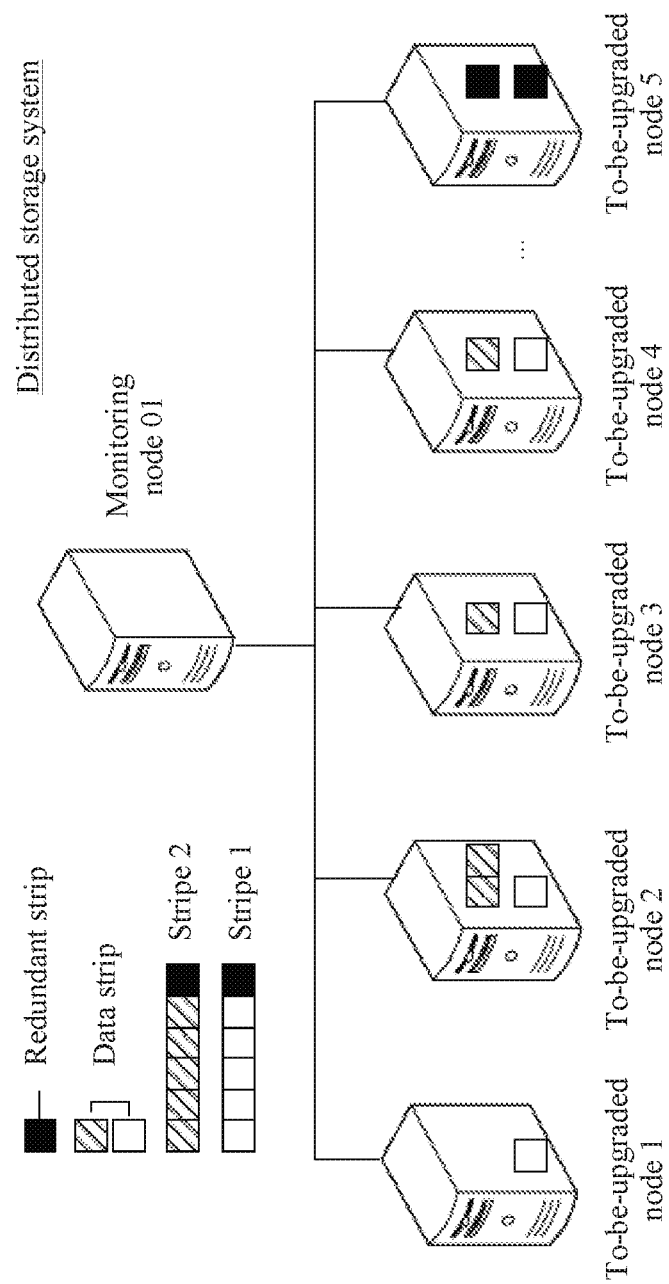
FIG. 3 is a schematic diagram 2 of a scenario of an online upgrade system according to an embodiment of the present invention.

For example, as shown in FIG. 3, the distributed storage system includes five to-be-upgraded nodes (that is, to-be-upgraded nodes 1-5). Four data strips and one redundant strip in a stripe 1 are separately stored on the five to-be-upgraded nodes. In a same stripe, there are a specific quantity of data strips and a specific quantity of redundant strips. For example, the stripe 1 includes four data strips and one redundant strip, and the one redundant strip and any three data strips may be used to restore a remaining one data strip. That is, in the stripe 1, a quantity of unavailable data strips should be less than a quantity of redundant strips, so as to ensure effective restoration of the unavailable data strips.

Therefore, when a to-be-upgraded node 1 is upgraded online, if a to-be-upgraded node 2 is a backup node of the to-be-upgraded node 1, that is, during an online upgrade period of the to-be-upgraded node 1, the to-be-upgraded node 2 is configured to store data that needs to be written into a stripe 2 (likewise, the stripe 2 also includes four data strips and one redundant strip), so as to ensure that write of new data into the stripe 2 is not affected during an upgrade of the to-be-upgraded node 2. In this case, the to-be-upgraded node 2 not only stores one data strip that is in the stripe 2 and that is originally written onto the to-be-upgraded node 2, but also stores one data strip that needs to be written onto the to-be-upgraded node 1. That is, the to-be-upgraded node 2 stores two data strips in the stripe 2.

When the to-be-upgraded node 2 is ready for an online upgrade, if the to-be-upgraded node 2 is directly powered off, the two data strips that are in the stripe 2 and that are stored on the to-be-upgraded node 2 cannot be restored from the one redundant strip and two data strips that remain in the stripe 2. As a result, a user cannot read the two data strips that are in the stripe 2 and that are stored on the to-be-upgraded node 2. Therefore, before the to-be-upgraded node 2 is upgraded, one data strip that needs to be written onto the to-be-upgraded node 1 and that is stored on the to-be-upgraded node 2 needs to be migrated back to the to-be-upgraded node 1, so as to ensure that read of data in the stripe 2 is not affected during the upgrade of the to-be-upgraded node 2.

In the prior art, each time a current to-be-upgraded node is upgraded online, for example, the to-be-upgraded node 2 is upgraded online, an extra time further needs to be waited for the to-be-upgraded node 2 to migrate back, to the to-be-upgraded node 1, service data (that is, the data strips in the stripe 2) that is temporarily written and that is of the to-be-upgraded node 1. Consequently, an online upgrade time of the overall distributed storage system increases.

Specifically, to resolve a problem that an online upgrade time of the N to-be-upgraded nodes 02 in the foregoing distributed storage system is excessively long, this embodiment of the present invention provides the online upgrade method. Before separately sending an upgrade instruction to the N to-be-upgraded nodes 02, the monitoring node 01 sets an upgrade sequence of the N to-be-upgraded nodes 02, and the N to-be-upgraded nodes 02 have different ranks in the upgrade sequence. Further, the monitoring node 01 determines a backup node of each to-be-upgraded node 02 in the N to-be-upgraded nodes according to the upgrade sequence of the N to-be-upgraded nodes 02, to obtain node backup information.

The foregoing node backup information includes a correspondence between an identifier of each to-be-upgraded node and an identifier of a backup node of the to-be-upgraded node 02. A backup node of the $X^{th}$ to-be-upgraded node is at least one node in a set including a to-be-upgraded node prior to the $X^{th}$ to-be-upgraded node in the upgrade sequence and a to-be-upgraded node following the $(X+[Z+1])^{th}$ to-be-upgraded node in the upgrade sequence, Z is a ratio of a time required by the $X^{th}$ to-be-upgraded node for migrating back service data to an online upgrade time of the $X^{th}$ to-be-upgraded node, $1 \leq X \leq N$, X is a positive integer, and [ ] is a symbol of a rounding function.

It should be noted that the foregoing to-be-upgraded node prior to the $X^{th}$ to-be-upgraded node is: in a determined upgrade sequence from the first to-be-upgraded node to the $N^{th}$ to-be-upgraded node, a to-be-upgraded node whose rank in the upgrade sequence is prior to that of the $X^{th}$ to-be-upgraded node, that is, a to-be-upgraded node in an open interval (0, X). In this way, when the $X^{th}$ to-be-upgraded node is subsequently upgraded online, if a backup node of the $X^{th}$ to-be-upgraded node is any to-be-upgraded node whose rank in the upgrade sequence is prior to that of the $X^{th}$ to-be-upgraded node, because the to-be-upgraded node prior to the $X^{th}$ to-be-upgraded node has completed an online upgrade, the $X^{th}$ to-be-upgraded node may directly perform, after completing the online upgrade, a process of migrating back service data from the backup node of the $X^{th}$ to-be-upgraded node, and the migrate-back process does not affect an online upgrade process of the subsequent $(X+1)^{th}$ to-be-upgraded node.

Correspondingly, the foregoing to-be-upgraded node following the $(X+[Z+1])^{th}$ to-be-upgraded node is: in the determined upgrade sequence from the first to-be-upgraded node to the $N^{th}$ to-be-upgraded node, a to-be-upgraded node whose rank in the upgrade sequence follows that of the $(X+[Z+1])^{th}$ to-be-upgraded node, that is, a to-be-upgraded node in a left-open and right-closed interval: $(X+[Z+1],N]$. In this way, when the $X^{th}$ to-be-upgraded node is subsequently upgraded online, if the backup node of the $X^{th}$ to-be-upgraded node is any to-be-upgraded node whose rank in the upgrade sequence follows that of the $(X+[Z+1])^{th}$ to-be-upgraded node, because Z is the ratio of the time required by the $X^{th}$ to-be-upgraded node for migrating back the service data to the online upgrade time of the $X^{th}$ to-be-upgraded node, that is, when the $(X+[Z+1])^{th}$ to-be-upgraded node completes the online upgrade, the $X^{th}$ to-be-upgraded node has also completed the service data migrate-back process. Therefore, after completing the online upgrade, the $X^{th}$ to-be-upgraded node may directly perform the process of migrating back the service data from the backup node of the $X^{th}$ to-be-upgraded node, and the migrate-back process does not affect the online upgrade process of the subsequent $(X+1)^{th}$ to-be-upgraded node.

The five to-be-upgraded nodes in the distributed storage system shown in FIG. 3 are still used as an example. An upgrade sequence of the five to-be-upgraded nodes is the to-be-upgraded node 1 to the to-be-upgraded node 5. It is assumed that an online upgrade time required by each to-be-upgraded node is 10 minutes, and a time required by each to-be-upgraded node for migrating back service data is also 10 minutes. In this case, when the monitoring node 01 determines a backup node of the to-be-upgraded node 1, at least one to-be-upgraded node in a to-be-upgraded node following the $(1+[10/10+1])^{th}$ to-be-upgraded node in the upgrade sequence may be used as the backup node of the to-be-upgraded node 1, that is, one or more to-be-upgraded nodes in the third to-be-upgraded node to the fifth to-be-upgraded node are used as backup nodes of the to-be-upgraded node 1. For example, the third to-be-upgraded node is used as the backup node of the to-be-upgraded node 1. In this way, after the to-be-upgraded node 1 completes the online upgrade, the to-be-upgraded node 2 may be directly triggered to perform an online upgrade, and in addition, the to-be-upgraded node 1 may be further triggered to migrate back, from the third to-be-upgraded node, service data that needs to be written onto the to-be-upgraded node 1. In addition, a time required by the to-be-upgraded node 2 for the online upgrade is the same as a time required by the to-be-upgraded node 1 for migrating back the service data. Therefore, when the to-be-upgraded node 2 completes the online upgrade, the to-be-upgraded node 1 has also completed migrating back the service data. In this case, the to-be-upgraded node 3 may still be directly triggered to perform an online upgrade.

It can be learned that, according to the online upgrade method provided in this embodiment of the present invention, the upgrade sequence of the N to-be-upgraded nodes is strictly controlled, and in addition, for each to-be-upgraded node, a node that has a relatively low rank in the upgrade sequence or that has completed an upgrade is selected as a backup node of the to-be-upgraded node, so as to ensure that read and write of service data are not affected during an online upgrade of each to-be-upgraded node. In addition, the $(X+1)^{th}$ to-be-upgraded node may directly start an online upgrade after the $X^{th}$ to-be-upgraded node completes an upgrade, without a need to wait for the $X^{th}$ to-be-upgraded node to complete migrating back the service data. Therefore, after completing the online upgrade, each to-be-upgraded node in the distributed storage system may directly perform a service data migrate-back process, and the migrate-back process does not affect an online upgrade of a subsequent to-be-upgraded node. This greatly shortens the online upgrade time of each to-be-upgraded node in the distributed storage system and improves online upgrade efficiency.

Figure 4:
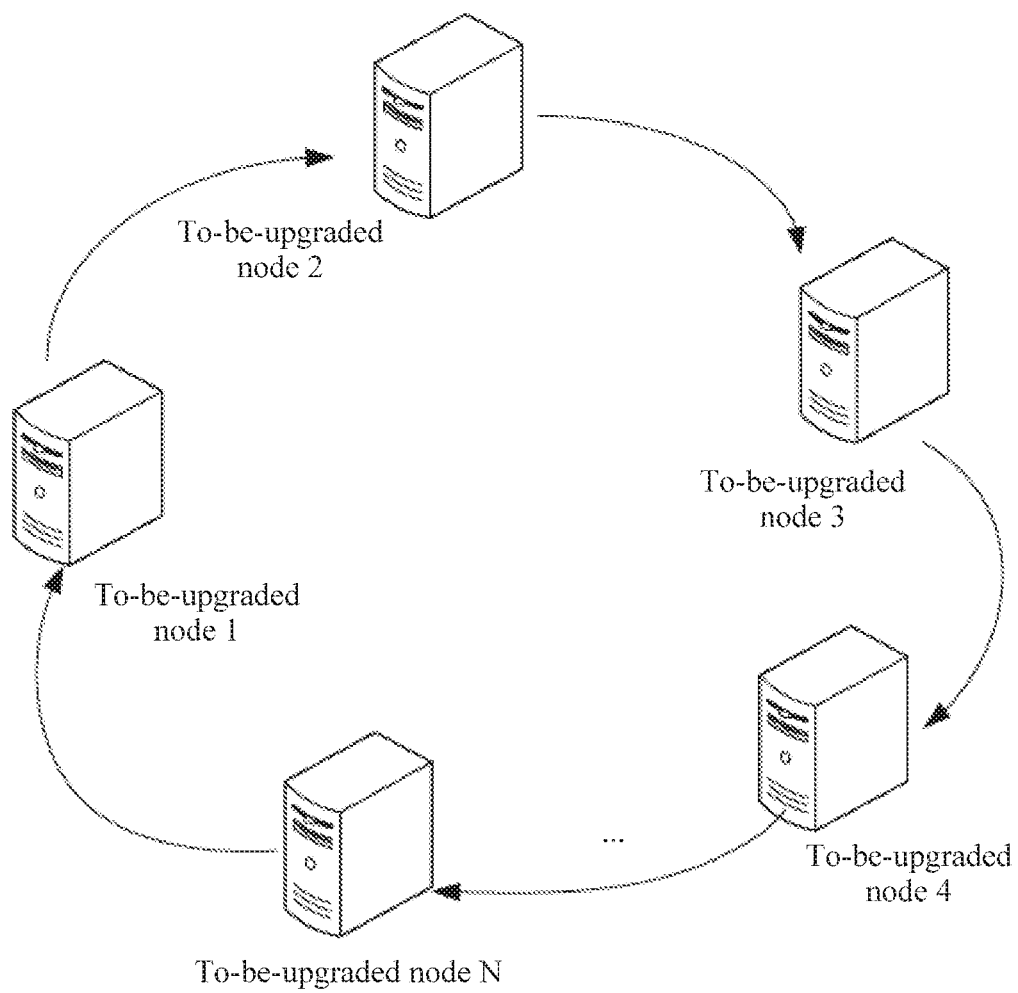
FIG. 4 is a schematic diagram of an upgrade sequence of N to-be-upgraded nodes according to an embodiment of the present invention.

Based on the foregoing online upgrade method, in a possible design, when X=1, the monitoring node may set the $N^{th}$ to-be-upgraded node as a backup node of the first to-be-upgraded node; or when $1<X \leq N$, the monitoring node may set the $(X-1)^{th}$ to-be-upgraded node as the backup node of the $X^{th}$ to-be-upgraded node. That is, as shown in FIG. 4, the upgrade sequence of the N to-be-upgraded nodes 02 may be logically considered as a closed ring. The backup node of the $X^{th}$ to-be-upgraded node is a previous to-be-upgraded node of the $X^{th}$ to-be-upgraded node in the upgrade sequence. For example, the backup node of the to-be-upgraded node 3 is the to-be-upgraded node 2. A backup node is configured to: when a to-be-upgraded node is upgraded online, temporarily act as an agent of the to-be-upgraded node to store service data that needs to be written onto the to-be-upgraded node, so as to ensure that a read/write service of a user is not affected when each to-be-upgraded node in the distributed storage system is upgraded online.

In this way, the upgrade sequence of the N to-be-upgraded nodes is strictly controlled, and the backup node of the $X^{th}$ to-be-upgraded node is the previous to-be-upgraded node of the $X^{th}$ to-be-upgraded node in the upgrade sequence, for example, the $(X-1)^{th}$ to-be-upgraded node. Therefore, when the $X^{th}$ to-be-upgraded node is upgraded online, the $(X-1)^{th}$ to-be-upgraded node acts as an agent of the $X^{th}$ to-be-upgraded node to store service data that needs to be written onto the $X^{th}$ to-be-upgraded node. In this case, the $(X-1)^{th}$ to-be-upgraded node has completed an upgrade. After the $X^{th}$ to-be-upgraded node completes the online upgrade, the monitoring node 01 may directly send an upgrade instruction to a to-be-upgraded node following the $X^{th}$ to-be-upgraded node in the upgrade sequence, for example, the $(X+1)^{th}$ to-be-upgraded node, and instruct the $X^{th}$ to-be-upgraded node to migrate back, from the $(X-1)^{th}$ to-be-upgraded node (that is, the backup node), service data that originally needs to be written onto the $X^{th}$ to-be-upgraded node but is temporarily written onto the $(X-1)^{th}$ to-be-upgraded node. That is, the $(X+1)^{th}$ to-be-upgraded node may directly start an online upgrade after the $X^{th}$ to-be-upgraded node completes the upgrade, without a need to wait for the $X^{th}$ to-be-upgraded node to complete migrating back the service data and without a need to calculate a ratio of a time required by the to-be-upgraded node for migrating back the service data to an online upgrade time of the to-be-upgraded node. Therefore, after completing the online upgrade, each to-be-upgraded node in the distributed storage system may directly perform a service data migrate-back process, and the migrate-back process does not affect an online upgrade of a subsequent to-be-upgraded node. This greatly shortens the online upgrade time of each to-be-upgraded node in the distributed storage system and improves the online upgrade efficiency.

Figure 5:
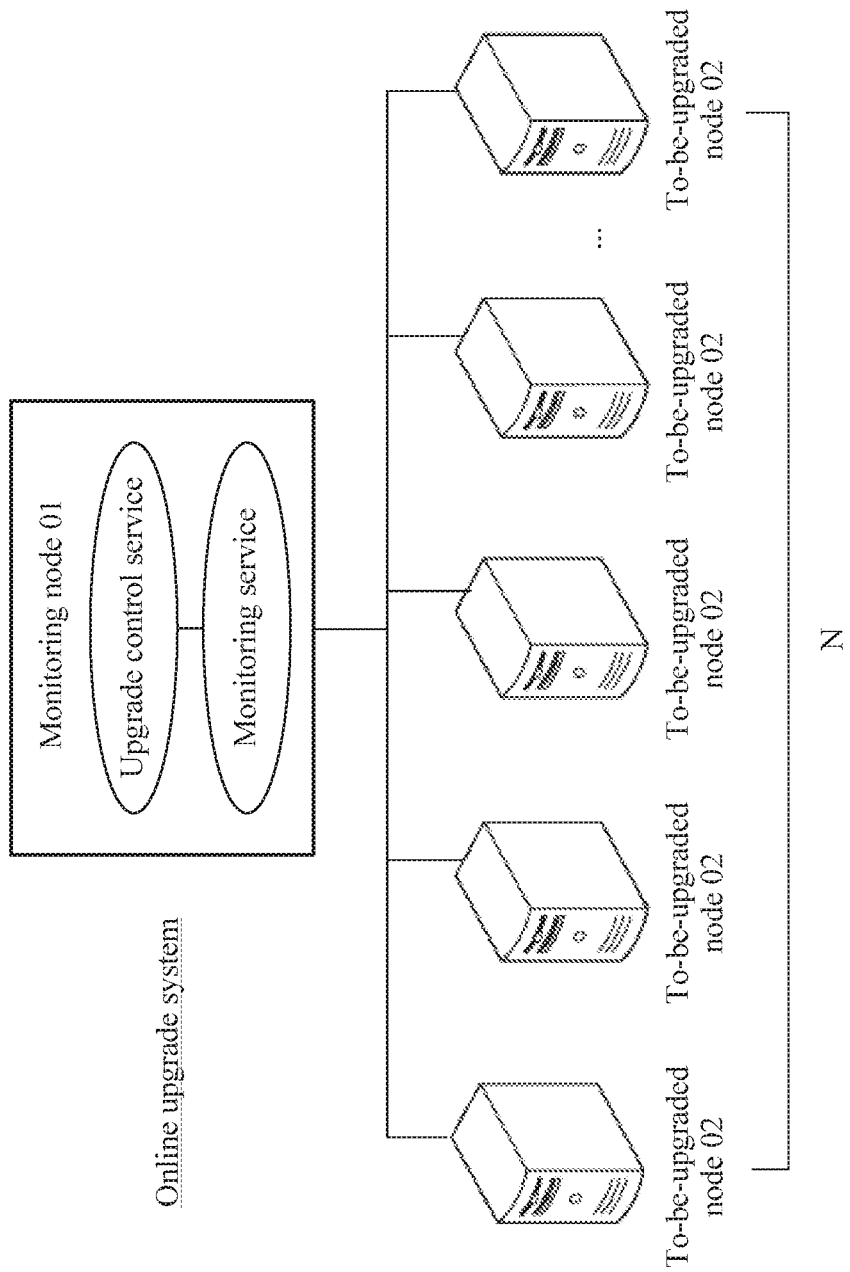
FIG. 5 is a schematic diagram 3 of a scenario of an online upgrade system according to an embodiment of the present invention.

Further, in a possible implementation, as shown in FIG. 5, the monitoring node 01 in this embodiment of the present invention may be specifically configured to execute an upgrade control service and a monitoring service.

For example, the upgrade control service may be specifically used to: receive an upgrade request delivered by an administrator, monitor an upgrade status of each to-be-upgraded node 02, collect and maintain statuses of N to-be-upgraded nodes 02 in an online upgrade system, and sort the N to-be-upgraded nodes 02 according to a specific rule, to obtain an upgrade sequence of the N to-be-upgraded nodes 02. In addition, the upgrade control service may interact with the monitoring service, and feed back information, such as the upgrade sequence of the N to-be-upgraded nodes 02 and an upgrade status of a to-be-upgraded node 02, to the monitoring service.

Correspondingly, the monitoring service may be specifically used to: receive an upgrade request and the upgrade sequence of the N to-be-upgraded nodes 02 that are fed back by the upgrade control service, and detect a status of a to-be-upgraded node 02. If a to-be-upgraded node 02 goes offline, the monitoring service may automatically provide a corresponding backup node for the to-be-upgraded node 02. In addition, after each service status in the online upgrade system is changed (for example, a to-be-upgraded node 02 is switched over or changed), the monitoring service may automatically push change information to each to-be-upgraded node 02.

It should be noted that, the upgrade control service and the monitoring service may be borne on one entity device as a functional module, may be set in different entity devices, or may be implemented in a form of a service cluster, and this embodiment of the present invention sets no limitation thereto. In the following embodiments, the monitoring node 01 is used as an example to describe in detail the online upgrade method provided in the embodiments of the present invention.

Figure 6:
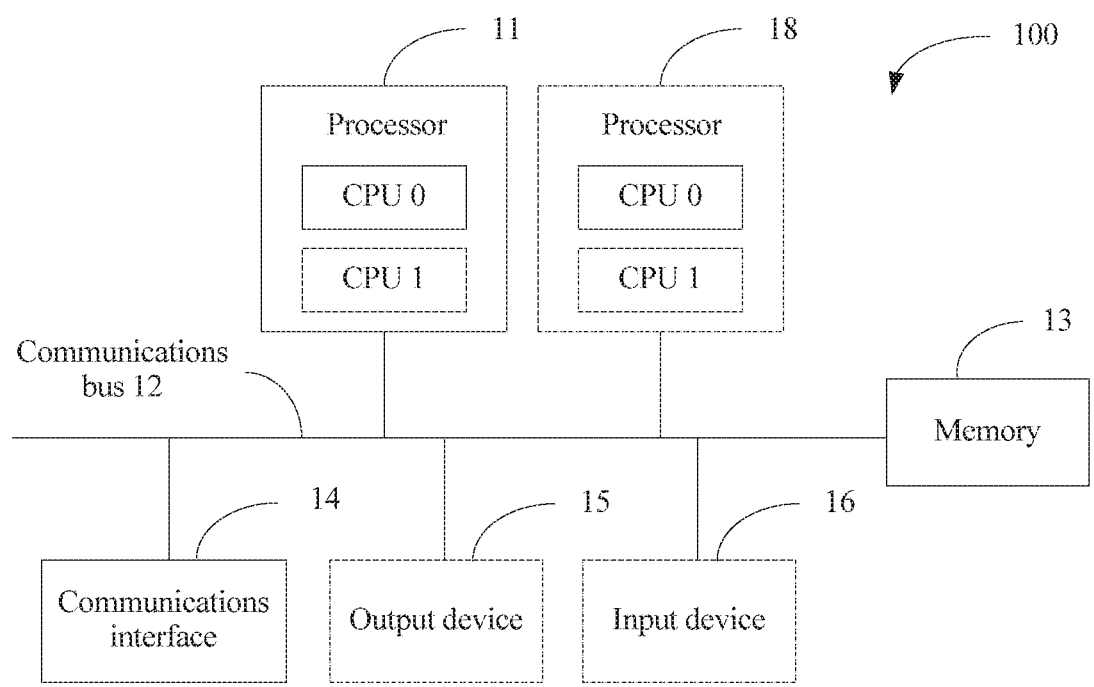
FIG. 6 is a schematic structural diagram of a computer device according to an embodiment of the present invention.

As shown in FIG. 6, the monitoring node of in FIG. 2 or any to-be-upgraded node 02 may be implemented in a manner of a computer device (or a system) in FIG. 6.

FIG. 6 is a schematic diagram of a computer device according to an embodiment of the present invention. The computer device 100 includes at least one processor 11, a communications bus 12, a memory 13, and at least one communications interface 14.

The processor 11 may be a general-purpose central processing unit (CPU), a microprocessor, an application-specific integrated circuit (ASIC), or one or more integrated circuits configured to control program execution of the solutions in the present invention.

The communications bus 12 may include a path in which information is transmitted between the foregoing components. The communications interface 14 may be any apparatus similar to a transceiver, and is configured to communicate with another device or communications network, such as an Ethernet, a radio access network (RAN), or a wireless local area network (WLAN).

The memory 13 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a disk storage medium or another magnetic storage device, or any other medium that can be used to carry or store expected program code that is in a form of an instruction or a data structure and that can be accessed by a computer. However, no limitation is set thereto. The memory 13 may exist independently and is connected to the processor by using the bus. Alternatively, the memory 13 may be integrated with the processor.

The memory 13 is configured to store application program code for executing the solutions of the present invention, and the processor 11 controls execution of the solutions of the present invention. The processor 11 is configured to execute the application program code stored in the memory 13.

In specific implementation, in an embodiment, the processor 11 may include one or more CPUs, such as a CPU 0 and a CPU 1 in FIG. 6.

In specific implementation, in an embodiment, the computer device 100 may include multiple processors such as a processor 11 and a processor 18 in FIG. 6. Each of these processors may be a single-core (single-CPU) processor or a multi-core (multi-CPU) processor. The processor herein may be one or more devices, circuits and/or processing cores configured to process data (for example, a computer program instruction).

In specific implementation, in an embodiment, the computer device 100 may further include an output device 15 and an input device 16. The output device 15 communicates with the processor 11 and may display information in multiple manners. For example, the output device 15 may be a liquid crystal display (LCD), a light emitting diode (LED) display device, a cathode ray tube (CRT) display device, a projector, or the like. The input device 16 communicates with the processor 11 and may receive input of a user in multiple manners. For example, the input device 16 may be a mouse, a keyboard, a touchscreen device, a sensor, or the like.

The foregoing computer device 100 may be a general-purpose computer device or a dedicated computer device. In specific implementation, the computer device 100 may be a desktop computer, a portable computer, a network server, a palmtop computer (e.g., a Personal Digital Assistant, PDA), a mobile phone, a tablet computer, a wireless terminal device, a communications device, a built-in device, or a device in a structure similar to that shown in FIG. 6. A type of the computer device 100 is not limited in this embodiment of the present invention.

It should be noted that, in this embodiment of the present invention, any functional node in the foregoing distributed storage system, for example, the monitoring node 01 or the to-be-upgraded node 02, may be implemented by one entity device or may be jointly implemented by multiple entity devices. Multiple functional nodes in the distributed storage system may be implemented by different entity devices or may be implemented by a same entity device. It should be understood that, any functional node in the distributed storage system may be a logical functional module in the entity device or may be a logical functional module including multiple entity devices.

Therefore, in the following embodiments of the present invention, each step in the method provided in the embodiments of the present invention may be executed by one entity device or may be executed in collaboration by multiple entity devices, and the present invention sets no limitation thereto.

Embodiment 1

Figure 7:
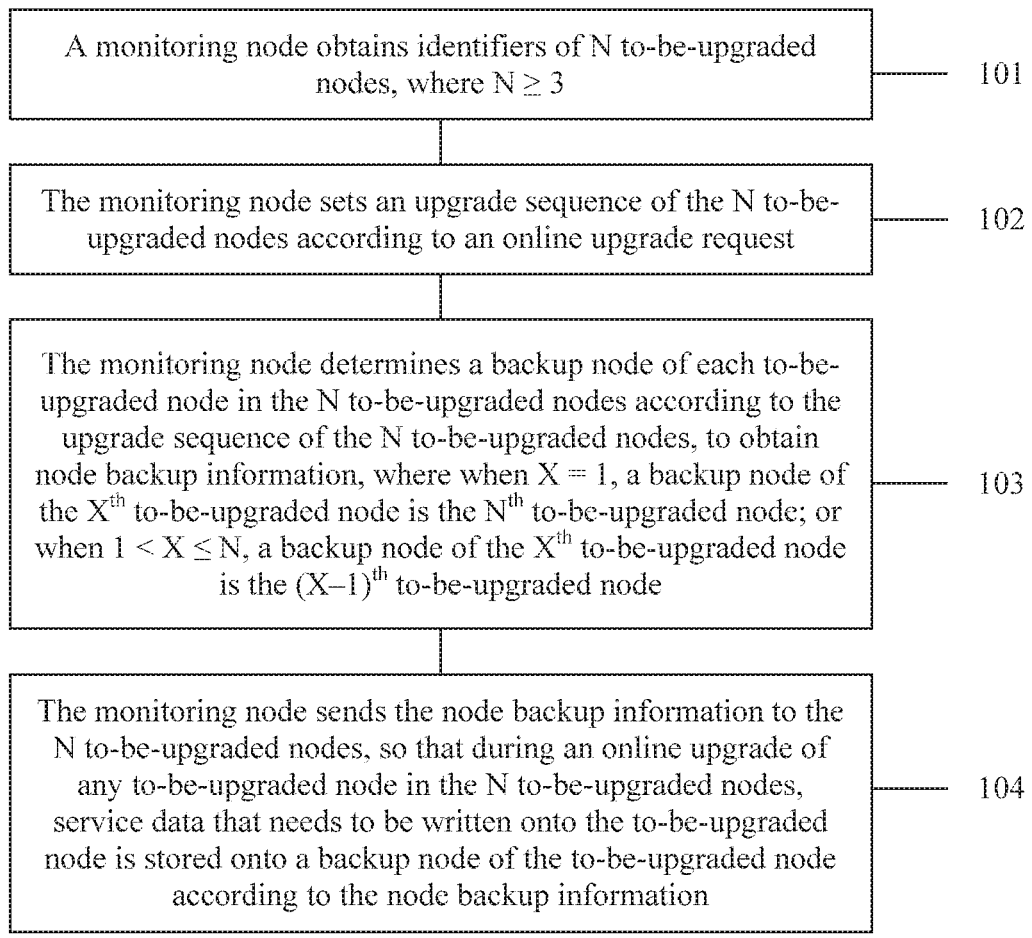
FIG. 7 is a schematic flowchart of an online upgrade method according to an embodiment of the present invention.

Based on the distributed storage system shown in FIG. 2 to FIG. 5, this embodiment of the present invention provides an online upgrade method. Before separately sending an upgrade instruction to N to-be-upgraded nodes, a monitoring node may set an upgrade sequence of the N to-be-upgraded nodes 02, and determine a backup node of each to-be-upgraded node according to the upgrade sequence of the N to-be-upgraded nodes, to obtain node backup information. As shown in FIG. 7, the method specifically includes the following steps.

101. The monitoring node obtains identifiers of the N to-be-upgraded nodes, where N≥3.

102. The monitoring node sets the upgrade sequence of the N to-be-upgraded nodes according to the identifiers of the N to-be-upgraded nodes.

103. The monitoring node determines the backup node of each to-be-upgraded node in the N to-be-upgraded nodes according to the upgrade sequence of the N to-be-upgraded nodes, to obtain the node backup information, where when X=1, a backup node of the $X^{th}$ to-be-upgraded node is the $N^{th}$ to-be-upgraded node; or when 1<X≤N, a backup node of the $X^{th}$ to-be-upgraded node is the $(X-1)^{th}$ to-be-upgraded node.

104. The monitoring node sends the node backup information to the N to-be-upgraded nodes, so that during an online upgrade of any to-be-upgraded node in the N to-be-upgraded nodes, service data that needs to be written onto the to-be-upgraded node is stored onto a backup node of the to-be-upgraded node according to the node backup information.

In step 101, the monitoring node may receive an online upgrade request sent by a control server, or directly receive an online upgrade request triggered by an administrator on an upgrade management interface. The online upgrade request carries the identifiers of the N to-be-upgraded nodes, and further, the monitoring node obtains the identifiers of the N to-be-upgraded nodes, where N≥3.

For example, a stripe 1 needs to be updated online in the current distributed storage system. The stripe 1 includes 10 strip blocks, and the 10 strip blocks are separately stored on to-be-upgraded nodes 1-10. In this case, the monitoring node may receive the online upgrade request delivered by the administrator, and the online upgrade request carries identifiers of the foregoing to-be-upgraded nodes 1-10.

The online upgrade request carries the identifiers of the N to-be-upgraded nodes. Therefore, in step 102, the monitoring node determines, according to the online upgrade request, the N to-be-upgraded nodes that need to be upgraded, and sets the upgrade sequence of the N to-be-upgraded nodes.

For example, the monitoring node may sort the N to-be-upgraded nodes according to sizes of IP addresses of the N to-be-upgraded nodes, to obtain the upgrade sequence of the N to-be-upgraded nodes, that is, the first to-be-upgraded node, the second to-be-upgraded node, . . . , the $X^{th}$ to-be-upgraded node, . . . , the $N^{th}$ to-be-upgraded node.

Alternatively, the monitoring node may sort the N to-be-upgraded nodes according to sizes of the identifiers of the N to-be-upgraded nodes, to obtain the upgrade sequence of the N to-be-upgraded nodes, and this embodiment of the present invention sets no limitation thereto.

In step 103, the monitoring node determines the backup node of each to-be-upgraded node in the N to-be-upgraded nodes according to the upgrade sequence of the N to-be-upgraded nodes, to obtain the node backup information.

When X=1, the backup node of the $X^{th}$ to-be-upgraded node is the $N^{th}$ to-be-upgraded node; or when 1<X≤N, the backup node of the $X^{th}$ to-be-upgraded node is the $(X-1)^{th}$ to-be-upgraded node. That is, the monitoring node uses a previous to-be-upgraded node of each to-be-upgraded node in the upgrade sequence as a backup node of the to-be-upgraded node. Therefore, when the $X^{th}$ to-be-upgraded node is upgraded online, the $(X-1)^{th}$ to-be-upgraded node acts as an agent of the $X^{th}$ to-be-upgraded node to store the service data that needs to be written onto the $X^{th}$ to-be-upgraded node.

In this way, in step 104, the monitoring node sends the foregoing node backup information to the N to-be-upgraded nodes. The node backup information includes the backup node of each to-be-upgraded node in the N to-be-upgraded nodes. Therefore, each to-be-upgraded node can determine a backup node of the to-be-upgraded node and backup nodes of other N-1 to-be-upgraded nodes. For example, when a to-be-upgraded node 1 performs an online upgrade by itself, other N-1 to-be-upgraded nodes may send, to a backup node of the to-be-upgraded node 1 according to the node backup information, service data that needs to be written onto the to-be-upgraded node 1, to ensure reliability of service data written into the distributed storage system by a user.

So far, according to the online upgrade method provided in this embodiment of the present invention, the upgrade sequence of the N to-be-upgraded nodes is strictly controlled, and the backup node of the $X^{th}$ to-be-upgraded node is a previous to-be-upgraded node of the $X^{th}$ to-be-upgraded node in the upgrade sequence. Therefore, when the $X^{th}$ to-be-upgraded node is upgraded online, the $(X-1)^{th}$ to-be-upgraded node acts as the agent of the $X^{th}$ to-be-upgraded node to store the service data that needs to be written onto the $X^{th}$ to-be-upgraded node. In this case, the $(X-1)^{th}$ to-be-upgraded node has completed an upgrade. After the $X^{th}$ to-be-upgraded node completes the online upgrade, the monitoring node may directly send an upgrade instruction to the $(X+1)^{th}$ to-be-upgraded node, and instruct the $X^{th}$ to-be-upgraded node to migrate back, from the $(X-1)^{th}$ to-be-upgraded node (that is, the backup node), the service data that originally needs to be written onto the $X^{th}$ to-be-upgraded node but is temporarily written onto the $(X-1)^{th}$ to-be-upgraded node. That is, the $(X+1)^{th}$ to-be-upgraded node may directly perform an online upgrade, without a need to wait for the $X^{th}$ to-be-upgraded node to complete migrating back the service data. Therefore, to-be-upgraded nodes in the distributed storage system can continuously perform a service data migrate-back process, and the migrate-back process does not affect an online upgrade of a subsequent to-be-upgraded node. This greatly shortens an online upgrade time of each to-be-upgraded node in the distributed storage system and improves online upgrade efficiency.

Embodiment 2

Figure 8:
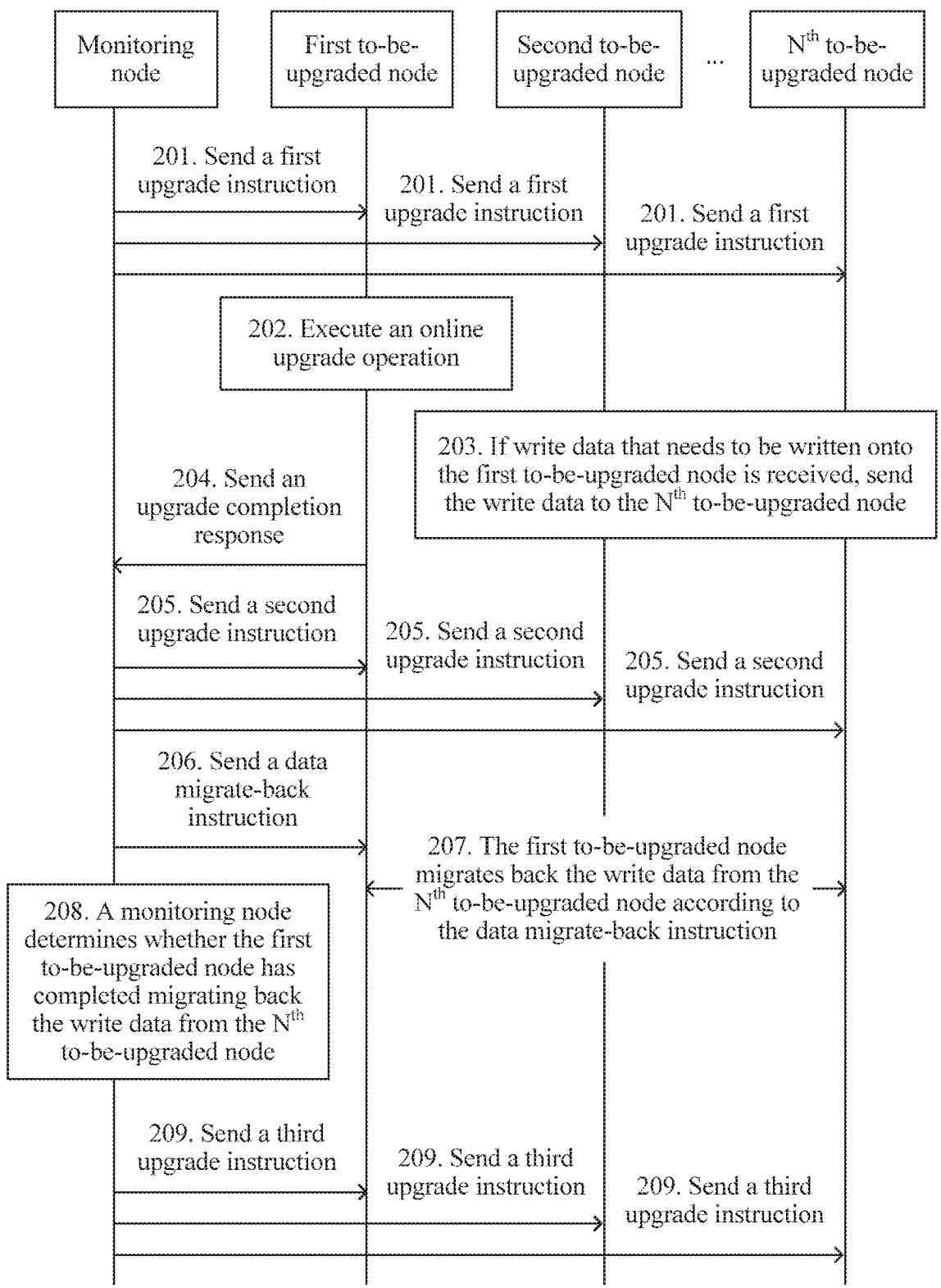
FIG. 8 is a schematic interaction diagram of an online upgrade method according to an embodiment of the present invention.

Based on the online upgrade method described in the foregoing Embodiment 1, this embodiment of the present invention provides an online upgrade method. In Embodiment 1, after the monitoring node determines the backup node of each to-be-upgraded node to obtain the node backup information, each to-be-upgraded node in the distributed storage system may further perform the online upgrade according to the backup information. As shown in FIG. 8, the method specifically includes the following steps 201-209.

201. A monitoring node sends a first upgrade instruction to N to-be-upgraded nodes, where the first upgrade instruction carries an identifier of the first to-be-upgraded node.

202. The first to-be-upgraded node executes an online upgrade operation after receiving the first upgrade instruction.

203. If receiving service data that needs to be written onto the first to-be-upgraded node, other N−1 to-be-upgraded nodes send the service data to the $N^{th}$ to-be-upgraded node according to node backup information.

204. After completing an online upgrade, the first to-be-upgraded node sends an upgrade completion response to the monitoring node.

205. After receiving the upgrade completion response sent by the first to-be-upgraded node, the monitoring node sends a second upgrade instruction to the N to-be-upgraded nodes, where the second upgrade instruction carries an identifier of the second to-be-upgraded node to trigger the second to-be-upgraded node to perform an online upgrade.

206. The monitoring node sends a data migrate-back instruction to the first to-be-upgraded node.

207. The first to-be-upgraded node migrates back the service data from the $N^{th}$ to-be-upgraded node according to the data migrate-back instruction.

208. If receiving an upgrade completion response sent by the $(N-1)^{th}$ to-be-upgraded node, the monitoring node determines whether the first to-be-upgraded node has completed migrating back the service data from the $N^{th}$ to-be-upgraded node.

209. If the first to-be-upgraded node has completed migrating back the service data from the $N^{th}$ to-be-upgraded node, the monitoring node sends a third upgrade instruction to the N to-be-upgraded nodes, where the third upgrade instruction carries an identifier of the $N^{th}$ to-be-upgraded node to trigger the $N^{th}$ to-be-upgraded node to perform an online upgrade.

In step 201, after the monitoring node sends the foregoing node backup information to the N to-be-upgraded nodes, the monitoring node sends the first upgrade instruction to the N to-be-upgraded nodes. The first upgrade instruction carries the identifier of the first to-be-upgraded node, that is, the monitoring node notifies the N to-be-upgraded nodes that the first to-be-upgraded node is currently being upgraded online.

A backup node of the first to-be-upgraded node is the last to-be-upgraded node, that is, the $N^{th}$ to-be-upgraded node.

In step 202, the first to-be-upgraded node may immediately execute the online upgrade operation after receiving the first upgrade instruction.

In a process in which the first to-be-upgraded node executes the online upgrade operation, service data cannot be normally stored. Therefore, the backup node of the first to-be-upgraded node, that is, the $N^{th}$ to-be-upgraded node, may act as an agent of the first to-be-upgraded node to store the service data that needs to be written onto the first to-be-upgraded node.

Further, in step 203, if receiving the service data that needs to be written onto the first to-be-upgraded node, the other N−1 to-be-upgraded nodes send the service data to the $N^{th}$ to-be-upgraded node according to the node backup information, and the $N^{th}$ to-be-upgraded node temporarily stores the service data for the first to-be-upgraded node.

In step 204, after completing the online upgrade, the first to-be-upgraded node sends the upgrade completion response to the monitoring node.

In step 205, after the monitoring node receives the upgrade completion response sent by the first to-be-upgraded node, because all the service data of the first to-be-upgraded node during an online upgrade period is stored on the $N^{th}$ to-be-upgraded node, migrating back the service data by the first to-be-upgraded node from the $N^{th}$ to-be-upgraded node does not affect the online upgrade of the second to-be-upgraded node. Therefore, the monitoring node may send the second upgrade instruction to the N to-be-upgraded nodes again. The second upgrade instruction carries the identifier of the second to-be-upgraded node to trigger the second to-be-upgraded node to perform the online upgrade, that is, the monitoring node notifies the N to-be-upgraded nodes that the second to-be-upgraded node is currently being upgraded online.

Corresponding to step 205, all the service data of the first to-be-upgraded node during the online upgrade period is stored on the $N^{th}$ to-be-upgraded node. Therefore, when the second to-be-upgraded node performs the online upgrade, migrating back the service data by the first to-be-upgraded node from the $N^{th}$ to-be-upgraded node is not affected.

Therefore, after step 204, as described in step 206, the monitoring node may further send the data migrate-back instruction to the first to-be-upgraded node.

Specifically, an execution sequence between step 205 and step 206 may not be limited in this embodiment of the present invention. That is, in this embodiment of the present invention, step 205 may be first executed, and then step 206 is executed; or step 206 may be first executed, and then step 205 is executed; or step 205 and step 206 may be executed simultaneously.

In this way, in step 207, after receiving the data migrate-back instruction, the first to-be-upgraded node migrates back, according to the data migrate-back instruction from the backup node of the first to-be-upgraded node, that is, the $N^{th}$ to-be-upgraded node, the service data that is temporarily written onto the $N^{th}$ to-be-upgraded node during the online upgrade of the first to-be-upgraded node.

Further, similar to steps 201-207, the monitoring node may sequentially perform, according to the foregoing method, online upgrade operations on the third to-be-upgraded node to the $(N-1)^{th}$ to-be-upgraded node in the upgrade sequence.

In step 208, if the monitoring node receives the upgrade completion response sent by the $(N-1)^{th}$ to-be-upgraded node, in this case, different from step 205, the monitoring node needs to determine whether the first to-be-upgraded node has completed migrating back the service data from the $N^{th}$ to-be-upgraded node, that is, whether step 207 is completed.

Further, in step 209, if the first to-be-upgraded node has completed migrating back the service data from the $N^{th}$ to-be-upgraded node, similar to step 205, the monitoring node may directly send the third upgrade instruction to the N to-be-upgraded nodes. The third upgrade instruction carries the identifier of the $N^{th}$ to-be-upgraded node to trigger the $N^{th}$ to-be-upgraded node to perform the online upgrade.

Correspondingly, if the first to-be-upgraded node has not completed migrating back the service data from the $N^{th}$ to-be-upgraded node, the monitoring node waits until the first to-be-upgraded node has completed migrating back the service data back from the $N^{th}$ to-be-upgraded node, and then the monitoring node sends the foregoing third upgrade instruction to the $N^{th}$ to-be-upgraded node, to trigger the last to-be-upgraded node in the distributed storage system, that is, the $N^{th}$ to-be-upgraded node, to perform the online upgrade.

So far, according to the online upgrade method provided in this embodiment of the present invention, the upgrade sequence of the N to-be-upgraded nodes is strictly controlled, and a backup node of the $X^{th}$ to-be-upgraded node is a previous to-be-upgraded node of the $X^{th}$ to-be-upgraded node in the upgrade sequence. Therefore, when the $X^{th}$ to-be-upgraded node is upgraded online, the $(X-1)^{th}$ to-be-upgraded node acts as an agent of the $X^{th}$ to-be-upgraded node to store service data that needs to be written onto the $X^{th}$ to-be-upgraded node. In this case, the $(X-1)^{th}$ to-be-upgraded node has completed an upgrade. After the $X^{th}$ to-be-upgraded node completes the online upgrade, the monitoring node may directly send an upgrade instruction to the $(X+1)^{th}$ to-be-upgraded node, and instruct the $X^{th}$ to-be-upgraded node to migrate back, from the $(X-1)^{th}$ to-be-upgraded node (that is, the backup node), the service data that originally needs to be written onto the $X^{th}$ to-be-upgraded node but is temporarily written onto the $(X-1)^{th}$ to-be-upgraded node. That is, the $(X+1)^{th}$ to-be-upgraded node may directly perform an online upgrade, without a need to wait for the $X^{th}$ to-be-upgraded node to complete migrating back the service data. Therefore, to-be-upgraded nodes in the distributed storage system can continuously perform a service data migrate-back process, and the migrate-back process does not affect an online upgrade of a subsequent to-be-upgraded node. This greatly shortens an online upgrade time of each to-be-upgraded node in the distributed storage system and improves online upgrade efficiency.

Embodiment 3

Figure 9:
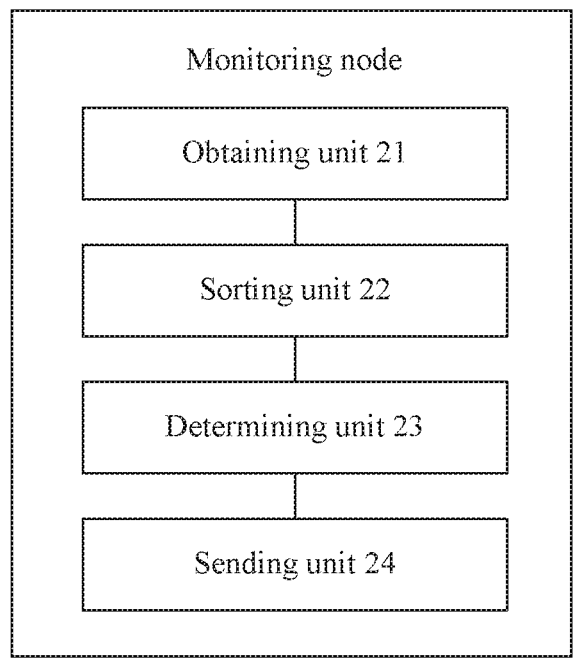
FIG. 9 is a schematic structural diagram 1 of a monitoring node according to an embodiment of the present invention.

FIG. 9 is a schematic structural diagram of a monitoring node according to an embodiment of the present invention. The monitoring node provided in this embodiment of the present invention may be configured to implement the method implemented in the foregoing embodiments of the present invention that are shown in FIG. 2 to FIG. 8. For ease of description, only a part related to this embodiment of the present invention is shown. For specific technical details that are not disclosed, refer to the embodiments of the present invention that are shown in FIG. 2 to FIG. 8.

Specifically, as shown in FIG. 9, the monitoring node includes an obtaining unit 21, a sorting unit 22, a determining unit 23, and a sending unit 24.

The obtaining unit 21 is configured to obtain identifiers of N to-be-upgraded nodes, where N≥3.

The sorting unit 22 is configured to set an upgrade sequence of the N to-be-upgraded nodes according to the identifiers of the N to-be-upgraded nodes, where the N to-be-upgraded nodes have different ranks in the upgrade sequence.

The determining unit 23 is configured to determine a backup node of each to-be-upgraded node in the N to-be-upgraded nodes according to the upgrade sequence of the N to-be-upgraded nodes, to obtain node backup information, where the node backup information includes a correspondence between an identifier of each to-be-upgraded node and an identifier of a backup node of the to-be-upgraded node, a backup node of the $X^{th}$ to-be-upgraded node is at least one node in a set including a to-be-upgraded node prior to the $X^{th}$ to-be-upgraded node in the upgrade sequence and a to-be-upgraded node following the $(X+[Z+1])^{th}$ to-be-upgraded node in the upgrade sequence, Z is a ratio of a time required by the $X^{th}$ to-be-upgraded node for migrating back service data to an online upgrade time of the $X^{th}$ to-be-upgraded node, and 1≤X≤N.

The sending unit 24 is configured to send the node backup information to the N to-be-upgraded nodes, so that during an online upgrade of any to-be-upgraded node in the N to-be-upgraded nodes, service data that needs to be written onto the to-be-upgraded node is stored onto a backup node of the to-be-upgraded node according to the node backup information.

Further, when X=1, the backup node of the $X^{th}$ to-be-upgraded node is the $N^{th}$ to-be-upgraded node; or when 1<X≤N, the backup node of the $X^{th}$ to-be-upgraded node is the $(X-1)^{th}$ to-be-upgraded node.

The sending unit 24 is further configured to send a first upgrade instruction to the N to-be-upgraded nodes, where the first upgrade instruction carries an identifier of the first to-be-upgraded node, and the first upgrade instruction is used to trigger the first to-be-upgraded node to perform an online upgrade.

The obtaining unit 21 is further configured to receive an upgrade completion response sent by the first to-be-upgraded node.

The sending unit 24 is further configured to send a data migrate-back instruction to the first to-be-upgraded node, so that the first to-be-upgraded node migrates back, from the $N^{th}$ to-be-upgraded node according to the data migrate-back instruction, service data that needs to be written onto the first to-be-upgraded node.

Further, the sending unit 24 is further configured to send a second upgrade instruction to the N to-be-upgraded nodes, where the second upgrade instruction carries an identifier of the $X^{th}$ to-be-upgraded node, and the second upgrade instruction is used to trigger the $X^{th}$ to-be-upgraded node to perform an online upgrade.

Figure 10:
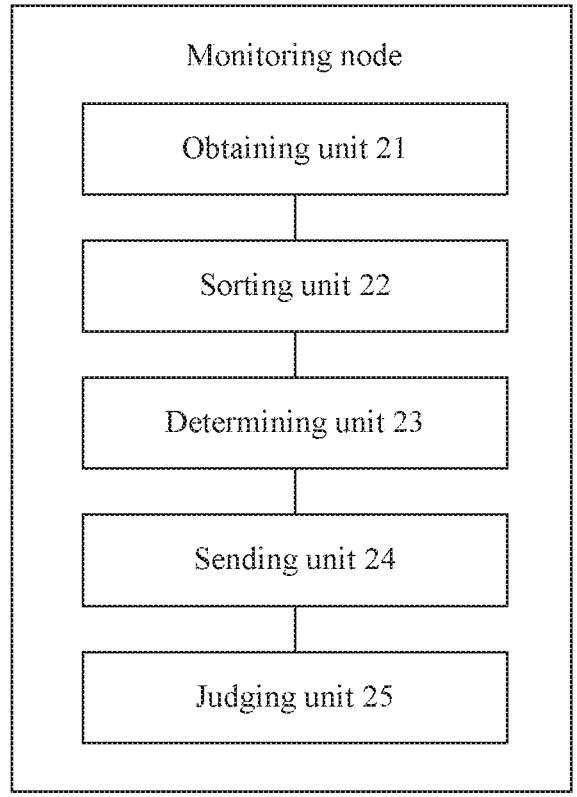
FIG. 10 is a schematic structural diagram 2 of a monitoring node according to an embodiment of the present invention.

Further, as shown in FIG. 10, the monitoring node further includes a judging unit 25.

The judging unit 25 is configured to: if an upgrade completion response sent by the $(N-1)^{th}$ to-be-upgraded node is received, determine whether the first to-be-upgraded node has completed migrating back the service data from the $N^{th}$ to-be-upgraded node.

The sending unit 24 is further configured to: if the first to-be-upgraded node has completed migrating back the service data from the $N^{th}$ to-be-upgraded node, send, by the monitoring node, a third upgrade instruction to the N to-be-upgraded nodes, where the third upgrade instruction carries an identifier of the $N^{th}$ to-be-upgraded node, and the third upgrade instruction is used to trigger the $N^{th}$ to-be-upgraded node to perform an online upgrade.

All the foregoing obtaining unit 21, sorting unit 22, determining unit 23, sending unit 24, and judging unit 25 may be implemented by the processor 11 shown in FIG. 6 by invoking an instruction in the memory 13.

Figure 11:
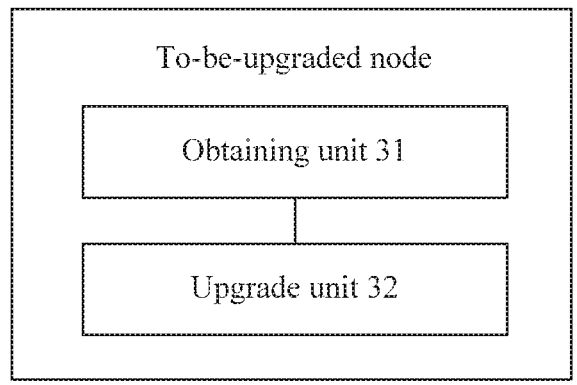
FIG. 11 is a schematic structural diagram 1 of a to-be-upgraded node according to an embodiment of the present invention.

FIG. 11 is a schematic structural diagram of a to-be-upgraded node according to an embodiment of the present invention. The monitoring node provided in this embodiment of the present invention may be configured to implement the method implemented in the foregoing embodiments of the present invention that are shown in FIG. 2 to FIG. 8. For ease of description, only a part related to this embodiment of the present invention is shown. For specific technical details that are not disclosed, refer to the embodiments of the present invention that are shown in FIG. 2 to FIG. 8.

Specifically, as shown in FIG. 11, the to-be-upgraded node includes an obtaining unit 31 and an upgrade unit 32.

The obtaining unit 31 is configured to: obtain node backup information sent by a monitoring node, where the node backup information includes a correspondence between an identifier of each to-be-upgraded node in N to-be-upgraded nodes and an identifier of a backup node of the to-be-upgraded node, and N≥3; and receive a local-node upgrade instruction sent by the monitoring node, where the local-node upgrade instruction carries an identifier of a first to-be-upgraded node, and the first to-be-upgraded node is any one of the N to-be-upgraded nodes.

The upgrade unit 32 is configured to execute an online upgrade operation according to the local-node upgrade instruction.

Figure 12:
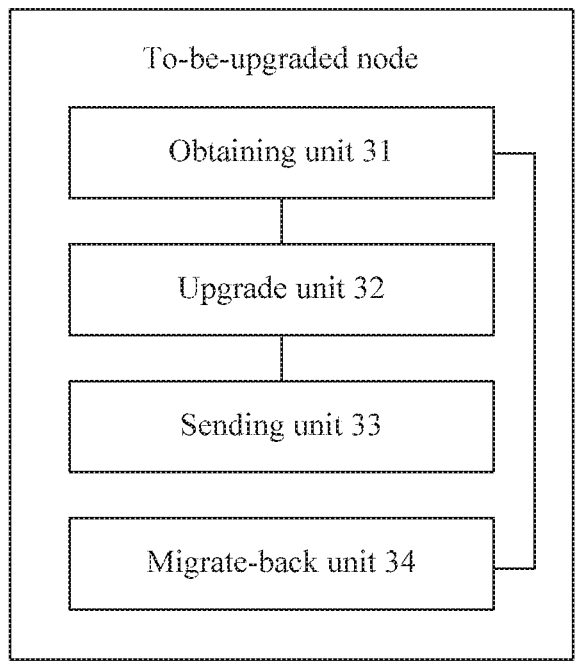
FIG. 12 is a schematic structural diagram 2 of a to-be-upgraded node according to an embodiment of the present invention.

Further, as shown in FIG. 12, the to-be-upgraded node further includes a sending unit 33 and a migrate-back unit 34.

The sending unit 33 is configured to send an upgrade completion response to the monitoring node.

The obtaining unit 31 is further configured to receive a data migrate-back instruction sent by the monitoring node.

The migrate-back unit 34 is configured to migrate back, from a backup node of the first to-be-upgraded node according to the data migrate-back instruction, service data that needs to be written onto the first to-be-upgraded node.

Figure 13:
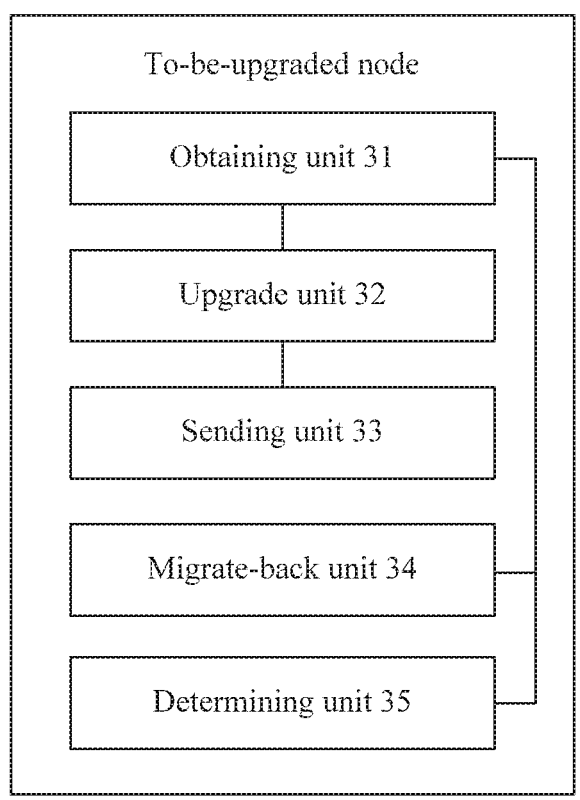
FIG. 13 is a schematic structural diagram 3 of a to-be-upgraded node according to an embodiment of the present invention.

Further, as shown in FIG. 13, the to-be-upgraded node further includes a determining unit 35.

The obtaining unit 31 is further configured to receive a non-local-node upgrade instruction sent by the monitoring node, where the non-local-node upgrade instruction carries an identifier of a second to-be-upgraded node, and the second to-be-upgraded node is any to-be-upgraded node in the N to-be-upgraded nodes except the first to-be-upgraded node.

The determining unit 35 is configured to determine a backup node of the second to-be-upgraded node according to the non-local-node upgrade instruction and the node backup information.

The sending unit 33 is further configured to: if service data that needs to be written onto the second to-be-upgraded node is received, send the service data to the backup node of the second to-be-upgraded node.

All the foregoing obtaining unit 31, upgrade unit 32, sending unit 33, migrate-back unit 34, and determining unit 35 may be implemented by the processor 11 shown in FIG. 6 by invoking an instruction in the memory 13.

So far, according to the online upgrade apparatus provided in the embodiments of the present invention, the upgrade sequence of the N to-be-upgraded nodes is strictly controlled, and in addition, for each to-be-upgraded node, a node that has a relatively low rank in the upgrade sequence or that has completed an upgrade is selected as a backup node of the to-be-upgraded node, so as to ensure that read and write of service data are not affected during an online upgrade of each to-be-upgraded node. In addition, the $(X+1)^{th}$ to-be-upgraded node may directly start an online upgrade after the $X^{th}$ to-be-upgraded node completes an upgrade, without a need to wait for the $X^{th}$ to-be-upgraded node to complete migrating back the service data. Therefore, after completing the online upgrade, each to-be-upgraded node in the distributed storage system may directly perform a service data migrate-back process, and the migrate-back process does not affect an online upgrade of a subsequent to-be-upgraded node. This greatly shortens the online upgrade time of each to-be-upgraded node in the distributed storage system and improves online upgrade efficiency.

It may be clearly understood by a person skilled in the art that, for the purpose of convenient and brief description, division of the foregoing functional modules is used as an example for illustration. In actual application, the foregoing functions may be allocated to different functional modules and implemented according to a requirement, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
setting, by a monitoring node, an upgrade sequence of N nodes of a distributed storage system, each node of the N nodes having a different rank in the upgrade sequence;
determining, by the monitoring node, node upgrade information identifying a first agent node of a first node of the N nodes, the first agent node being in the upgrade sequence and being a different node than both the first node and a node immediately after the first node in the upgrade sequence; and
sending, by the monitoring node to the N nodes, the node upgrade information instructing the first agent node to act as an agent of the first node and to store, in place of the first node while the first node is being upgraded, service data originally to be written to the first node.

2. The method according to claim 1, wherein the first agent node is ranked prior to the first node in the upgrade sequence.

3. The method according to claim 1, wherein:
the first node is an $X^{th}$ node in the upgrade sequence; and
setting the upgrade sequence comprises ranking the first agent node as a $(X+[Z+1])^{th}$ node in the upgrade sequence, wherein Z is a ratio of a time, which is required by the $X^{th}$ node for migrating back service data, to an online upgrade time of the $X^{th}$ node.

4. The method according to claim 1, wherein:
the first node is an $X^{th}$ node in the upgrade sequence; and
determining the node upgrade information comprises:
identifying, when X=1, an $N^{th}$ node to be upgraded as the first agent node of the first node; or
identifying, when $1<X\leq N$, an $(X-1)^{th}$ node to be upgraded as the first agent node of the first node.

5. The method according to claim 1, further comprising:
receiving, by the monitoring node from the first node, an upgrade completion response; and
sending, by the monitoring node to the first node, a data migrate-back instruction instructing the first node to migrate back from the first agent node the service data stored by the first agent node while the first node was being upgraded.

6. The method according to claim 1, further comprising:
sending, by the monitoring node to the first node, a first upgrade instruction causing the first node to perform a first online upgrade.

7. The method according to claim 6, further comprising:
sending, by the monitoring node, after receiving a first upgrade completion response from the first node, a second upgrade instruction to a second node, the second node being the node immediately after the first node in the upgrade sequence, the second upgrade instruction carrying an identifier of the second node, and the second upgrade instruction causing the second node to perform a second online upgrade.

8. The method according to claim 7, wherein:
the node upgrade information further identifies a second agent node of the second node, the second agent node being in the upgrade sequence and being a different node than both the second node and a node immediately after the second node in the upgrade sequence; and
sending the node upgrade information further instructs the second agent node to act as an agent of the second node and to store, in place of the second node, another service data originally to be written to the second node, while the second node is performing the second online upgrade.

9. The method according to claim 8, further comprising:
receiving, by the monitoring node, an upgrade completion response from the second node; and
sending, by the monitoring node to the second node, a data migrate-back instruction instructing the second node to migrate back the another service data from the second agent node.

10. A method, comprising:
obtaining, by a source node in a distributed storage system, node upgrade information sent by a monitoring node, wherein the node upgrade information indicates that a second node, which is one of N nodes to be upgraded in the distributed storage system according to an upgrade sequence, is a first agent node of a first node of the N nodes, wherein the first agent node is a different node than both the first node and a node immediately after the first node in the upgrade sequence;
receiving, by the source node while the first node is being upgraded, service data is originally to be written to the first node; and
sending, by the source node to the first agent node, according to the node upgrade information, the service data, causing the first agent node to store, in place of the first node, the service data originally to be written to the first node while the first node is being upgraded.

11. The method according to claim 10, further comprising:
receiving, by the source node from the monitoring node, a non-local-node upgrade instruction, wherein the non-local-node upgrade instruction carries an identifier of a third node of the N nodes other than the source node, and wherein the node upgrade information further identifies a second agent node of the third node;
determining, by the source node, the second agent node of the third node according to the non-local-node upgrade instruction and the node upgrade information; and
sending, by the source node to the second agent node when the third node is being upgraded, another service data originally to be written to the third node, causing the second agent node to store, in place of the second node, the another service data originally to be written to the third node while the third node is being upgraded.

12. A system, comprising:
a monitoring node;
N nodes that are to be upgraded comprising a first node and a first agent node of the first node; and
a source node;
wherein the monitoring node is configured to:
set an upgrade sequence of the N nodes, each node of the N nodes having a different rank in the upgrade sequence;
set a node upgrade information that identifies a the first agent node of the first node, wherein the first agent node is a different node than both the first node and a node immediately after the first node in the upgrade sequence; and send the node upgrade information to the N nodes;

wherein the first node is configured to be upgraded during an online upgrade period, according to the upgrade sequence;

wherein the source node is configured to send, to the first agent node during the online upgrade period of the first node and according to the node upgrade information, service data originally to be written to the first node while the first node is being upgraded; and wherein the first agent node is configured to store, in place of the first node during the online upgrade period of the first node according to the node upgrade information, the service data originally to be written to the first node while the first node is being upgraded.

13. The system according to claim 12, wherein the first agent node is ranked prior the first node in the upgrade sequence.

14. The system according to claim 12, wherein:

the first node is an $X^{th}$ node in the upgrade sequence; and the first agent node is ranked as a $(X+[Z+1])^{th}$ node in the upgrade sequence, wherein Z is a ratio of a time, which is required by the $X^{th}$ node for migrating back service data, to an online upgrade time of the $X^{th}$ node.

15. The system according to claim 12, wherein:

the monitor node is further configured to:

receive, from the first node, an upgrade completion response; and send, to the first node, a data migrate-back instruction; and the first node is further configured to migrate back from the first agent node, according to the data migrate-back instruction, the service data stored by the first agent node while the first node was being upgraded.

16. The system according to claim 12, wherein the monitoring node is further configured to send, to the first node, a first upgrade instruction causing the first node to perform a first online upgrade during the online upgrade period.

17. The system according to claim 16, wherein the monitoring node is further configured to:

send, after receiving a first upgrade completion response from the first node, a second upgrade instruction to a third node, wherein the third node is the node immediately after the first node in the upgrade sequence, wherein the second upgrade instruction carries an identifier of the third node, and wherein the second upgrade instruction causes the third node to perform a second online upgrade.

18. A source node, comprising:

a processor; and a non-transitory computer-readable memory storing a program to be executed by the processor, the program including instructions to:

obtain node upgrade information sent by a monitoring node, wherein the node upgrade information indicates that a second node, which is one of N nodes to be upgraded according to an upgrade sequence, is a first agent node of a first node of the N nodes, wherein the first agent node is a different node than both the first node and a node immediately after the first node in the upgrade sequence;

receive, while the first node is being upgraded, service data originally to be written to the first node; and send, to the first agent node according to the node upgrade information, the service data, causing the first agent node to store, in place of the first node, the service data originally to be written to the first node while the first node is being upgraded.

19. The source node according to claim 18, wherein the source node, the second node and the first node belong to a distributed storage system.

* * * * *

UNITED STATES PATENT AND TRADEMARK OFFICE
CERTIFICATE OF CORRECTION

| | | |
|---|---|---|
| PATENT NO. | : 10,999,139 B2 | Page 1 of 1 |
| APPLICATION NO. | : 16/112374 | |
| DATED | : May 4, 2021 | |
| INVENTOR(S) | : Hongxing Guo | |

It is certified that error appears in the above-identified patent and that said Letters Patent is hereby corrected as shown below:

In the Claims

Column 22, Line 33, Claim 10, delete "service data is originally" and insert --service data originally--.

Signed and Sealed this
Seventh Day of September, 2021

Drew Hirshfeld
*Performing the Functions and Duties of the
Under Secretary of Commerce for Intellectual Property and
Director of the United States Patent and Trademark Office*